United States Patent
Leroux et al.

(10) Patent No.: US 12,556,274 B2
(45) Date of Patent: Feb. 17, 2026

(54) RECEIVER DEVICE FOR COMMUNICATION BY MODULATED LIGHT TRANSMISSION

(71) Applicant: Orange, Issy-les-Moulineaux (FR)

(72) Inventors: Sylvain Leroux, Chatillon (FR); Thierry Gaillet, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 275 days.

(21) Appl. No.: 18/563,843

(22) PCT Filed: May 24, 2022

(86) PCT No.: PCT/FR2022/050982
§ 371 (c)(1),
(2) Date: Nov. 22, 2023

(87) PCT Pub. No.: WO2022/248802
PCT Pub. Date: Dec. 1, 2022

(65) Prior Publication Data
US 2024/0372615 A1    Nov. 7, 2024

(30) Foreign Application Priority Data
May 27, 2021  (FR) ...................... 2105552

(51) Int. Cl.
*H04B 10/00*   (2013.01)
*H04B 10/11*   (2013.01)
(Continued)

(52) U.S. Cl.
CPC .......... *H04B 10/11* (2013.01); *H04B 10/691* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS 10,895,701 B1 * 1/2021 Olsson ..................... G02B 6/42
11,101,888 B2 * 8/2021 Maierbacher .......... B25J 19/025
(Continued)

FOREIGN PATENT DOCUMENTS

JP  2014/090500 A   5/2014
KR  20-0446589 Y1  11/2009

OTHER PUBLICATIONS

French Search Report and Written Opinion for French Application No. FR2105552 dated Feb. 10, 2022.
(Continued)

*Primary Examiner* — Daniel G Dobson
(74) *Attorney, Agent, or Firm* — Knobbe, Martens, Olson & Bear, LLP (57) ABSTRACT

A receiver device for communication via modulated light transmission, intended to be coupled to a terminal which uses data received via modulated light, is disclosed. The receiver device includes at least one trough, said trough comprising: a slot for receiving at least one light ray of the modulated light, and a first guiding surface, coupled to the slot, said slot being arranged at the entrance to the first guiding surface, the first guiding surface comprising at least one internal surface which is reflective and shaped to guide the light ray by successive reflections to at least one photoreceiver coupled to the receiver device.

15 Claims, 6 Drawing Sheets

(51) Int. Cl.
*H04B 10/69* (2013.01)
*H04J 14/00* (2006.01)

(58) Field of Classification Search
CPC .............. H04B 10/114; H04B 10/1141; H04B 10/1143; H04B 10/116; H04B 10/118
See application file for complete search history.

(56) References Cited

U.S. PATENT DOCUMENTS

2019/0044618 A1  2/2019  Collins
2020/0092002 A1  3/2020  Islim et al.

OTHER PUBLICATIONS

International Search Report for International Application No. PCT/FR2022/050982 dated Sep. 29, 2022.

\* cited by examiner

RECEIVER DEVICE FOR COMMUNICATION BY MODULATED LIGHT TRANSMISSION

CROSS-REFERENCE TO RELATED APPLICATIONS

This application is filed under 35 U.S.C. § 371 as the U.S. National Phase of Application No. PCT/FR2022/050982 entitled "RECEIVER DEVICE FOR COMMUNICATION BY MODULATED LIGHT TRANSMISSION" and filed May 24, 2022, and which claims priority to FR 2105552 filed May 27, 2021, each of which is incorporated by reference in its entirety.

TECHNICAL FIELD

This disclosure relates to the field of telecommunications and in particular to communications via modulated light transmission.

PRIOR ART

It is known to transmit data wirelessly using modulated light as a communication vector. LiFi technology, where LiFi is an acronym for "Light Fidelity", is an example of the technology of visible light communication (VLC), or invisible light communication for example by infrared radiation, enabling high-speed data distribution via modulated light transmission.

Advantageously, data transmission via modulated light does not create interference with radio waves. Data can thus be transmitted via modulated light in environments where it is difficult or even impossible to use radio waves, such as hospitals and airplanes for example. The transmission of information via modulated light can then replace or be used as a supplement to transmission by radio waves, in situations where the propagation of radio waves is not optimal.

However, the transmission of information via modulated light requires the propagation of light through direct visibility, or Line Of Sight (LOS). Consequently, if a light ray carrying information encounters an obstacle in a path between a transmitter and a receiver, the light ray does not reach the receiver and communication is cut off.

In addition, LED-type bulbs are generally used by LiFi technologies to emit a light beam comprising a plurality of light rays carrying information. Although the information is transmitted by the plurality of light rays in the light beam, a receiver device receiving information via modulated light most often comprises a single receiver that is small in size. The quality of the information reception thus depends on the reception of light rays by the small receiver. In particular, when the receiver device is moved, the reception quality can vary, particularly when the inclination of the receiver device relative to the transmitter varies.

SUMMARY

This disclosure improves the situation.

It is based on an approach which consists of expanding the information received by a photoreceiver in a communication system which uses modulated light transmission, in particular by adding a reception surface which allows receiving light rays of the modulated light and focusing them on the photoreceiver. The reception quality of the information received by the photoreceiver can also be increased.

For this purpose, a receiver device for communication via modulated light transmission is proposed, intended to be coupled to a terminal which uses data received via modulated light, the receiver device comprising at least one trough, said trough comprising: a slot for receiving at least one light ray of the modulated light, and a first guiding surface, coupled to the slot, said slot being arranged at the entrance to the first guiding surface, the first guiding surface comprising at least one internal surface which is reflective and shaped to guide the light ray by successive reflections to at least one photoreceiver coupled to the receiver device.

It is thus understood that by means of the receiver device, it is possible to focus, on the photoreceiver, light rays of the modulated light for which a path not diverted by the receiver device would not have traveled to the photoreceiver. The photoreceiver can then receive a greater number of light rays carrying information. In particular, it is possible to combine a reception of the signal arriving directly on the photoreceiver with a reception of additional light rays guided by the receiver device. The quality of signal reception by the photoreceiver can thus be increased.

In addition, the receiver device can make it possible to capture signals resulting from reflection on a partition, such as a wall, which, during a loss of light propagation through line of sight, allows capturing signals resulting from reflection on a partition by means of the trough and then focusing these signals on the photoreceiver.

The features set forth in the following paragraphs may optionally be implemented, independently of each other or in combination with each other:

According to a first characteristic of the description, the trough of the receiver device further comprises the at least one photoreceiver, said photoreceiver being housed at one end of the trough, and a communication interface for transmitting the data received by the at least one photoreceiver to the terminal.

It is thus possible to provide for transmission of the data received by the photoreceiver to the terminal, in order to enable the terminal to use the data received by the photoreceiver. Since the reception and reception quality of the signal by the photoreceiver can be increased, the speed at which information is received by the terminal can also be increased.

According to another characteristic of the description, the receiver device further comprises a sealed enclosure containing a liquid, the sealed enclosure being made of a material transparent to said light ray, and the sealed enclosure houses the trough, the trough being able to float on the surface of said liquid, the slot of the trough being oriented upwards by flotation.

Such a characteristic therefore makes it possible to force and stabilize an upward orientation of the trough's slot, by means of passive equilibrium. This option can be particularly advantageous when the light rays are emitted in a downward vertical direction because it allows maximizing the angle of reception of the signal by the trough, thus maximizing the reception of the signal received by the photoreceiver after the signal received by the trough has been guided to the photoreceiver via the internal reflective surface.

According to another characteristic of the description, the first guiding surface is a surface of a cylinder and the trough is mounted so as to rotate about a longitudinal axis of the cylinder.

In this case, the orientation of the trough can vary around the longitudinal axis of the cylinder, which allows adjusting the orientation of the trough. The adjustment to the orientation of the trough can for example be a manual adjustment in order to increase the angle of reception of the signal by the trough.

According to another characteristic of the description, the receiver device further comprises at least one actuator intended to be controlled by a processing unit which processes the signal received from the photoreceiver, the processing unit being configured to detect a maximum in the received signal, and the actuator being coupled to the processing unit in order to apply a trough modification so as to maximize the received signal.

Maximization of the received signal can be understood to be a maximization of the useful signal received by the photoreceiver, i.e. maximization of the data received via modulated light by the photoreceiver. Maximization of the signal received by the photoreceiver can for example be correlated to maximization of the reception of modulated light signals by the receiver device. In other words, an increase in the reception of modulated light signals by the photoreceiver can result in an increase in the reception of modulated light signals by the receiver device. The trough modification can thus be made to maximize reception of the received signal.

The trough modification can thus be for example a rotation of the cylinder and/or a covering of the slot and/or an increase in the guiding surface. Such a characteristic can allow closed-loop control of the receiver device in order to apply the trough modification which maximizes the signal received by the photoreceiver.

In this case, the trough can be automatically modified in real time to maximize the signal received by the photoreceiver.

More particularly, according to one characteristic, the at least one actuator is an actuator for rotating the cylinder in order to orient the slot so as to maximize the received signal.

This characteristic is advantageous in particular when the orientation of the slot relative to the modulated light source has changed, which can happen for example when a user changes the inclination of the receiver device. The processing unit can then emit an instruction in real-time that is adapted to the new inclination of the receiver device and allows modifying the orientation of the slot to maximize the signal received by the photoreceiver.

According to another characteristic, the trough further comprises at least one opaque flap that is adjustable in order to cover the slot and for which the covering action is controlled by the at least one actuator.

Such a characteristic may allow adjusting a width of the slot in order to maximize the signal received by the photoreceiver. The width of the slot may for example be adjusted in order to filter out stray light rays. Indeed, the greater the width of the slot, the greater the quantity of light rays containing information received by the slot. However, the quantity of stray light rays received by the slot may also be increased. Stray light rays can for example be light rays which are not information-modulated. Thus, the signal-to-noise ratio, meaning the ratio between the useful information contained in the light rays carrying information and the stray light rays, may not be increased when the width of the slot is increased. Advantageously, the covering of the slot by the at least one actuator can in particular make it possible to determine the width of the slot which maximizes the signal-to-noise ratio and maximizes the reception of the received signal. The covering of the slot may also be controlled to modify the orientation of the slot so as to maximize the received signal. For example, for a given slot width, the orientation of the slot can be modified, which can make it possible to maximize a reception angle and/or signal reception rate of the received signal.

According to another characteristic, the trough houses, in addition to the first guiding surface, a second guiding surface coupled to a second slot and mounted so as to slide along a longitudinal axis of the first guiding surface.

This characteristic can make it possible to modify a total guiding surface area, by modifying a total length along the longitudinal axis. The total guiding surface area can be understood as being the sum of the areas of the first and second guiding surfaces capable of receiving light rays through the first and second slots. The total length can be understood as being the sum of the lengths of the first and second guiding surfaces capable of receiving light rays through the first and second slots. Thus, the total guiding surface area for the light signals can be modular and adapted to a context of use. For example, the total guiding surface area can be adapted to have a length corresponding to a length of the associated terminal.

Furthermore, in one embodiment, a sliding of the second guiding surface is driven by the at least one actuator in order to control the total guiding surface area so as to maximize the received signal.

Thus, the total guiding surface area can be adapted to different conditions of use. For example, if sliding the second guiding surface in one direction provides more stray light rays than light rays containing useful information, the processing unit can control the actuator to cause a sliding in the opposite direction.

This description also relates to a light reception system for receiving modulated light, comprising at least one receiver device according to one of the preceding paragraphs and a terminal coupled to the receiver device in order to use the data received via modulated light.

Advantageously, when the signal received by the photoreceiver is increased, a quality of the data used by the terminal can be increased. This in particular allows using the light reception system in restricted environments, in particular those subject to corruption of electromagnetic signals, with better quality in the reception of data used by the terminal.

According to another characteristic, the light reception system additionally comprises a receiver device comprising at least one actuator intended to be controlled by a processing unit which processes the signal received from the photoreceiver; and a processing unit which processes the signal received from the photoreceiver and is configured to detect a maximum in the received signal, coupled to the actuator in order to apply a trough modification so as to maximize the received signal.

Thus, the signal received by the photoreceiver is maximized, which can maximize the quality of the data used by the terminal and allow providing a better user experience.

According to another characteristic, the processing unit of the light reception system is configured to control the actuator according to a "PID" (Proportional Integral Derivative) type regulator.

Use of the PID type regulator can allow controlling the actuator in a robust, rapid, and precise manner. This means that the trough modification which maximizes the received signal can be quickly achieved by reducing the discontinuities between two successive instructions applied to the actuator, while ensuring low error between the maximum reached in the received signal and the true maximum in the received signal.

According to an additional characteristic, the processing unit of the light reception system is configured to send adjustment instructions to said actuator and to store said instructions in memory with links to context of use data for the light reception system, the storage in memory forming a training database for an artificial intelligence capable of being implemented by the processing unit in order to issue target instructions to the actuator according to a current context of use.

Such a characteristic can thus make it possible to quickly and accurately identify adjustment instructions for said actuator based on past instructions and on a current context of use, particularly for environments in which the current context of use is repetitive, such as factories for example.

According to another characteristic, the light reception system comprises a plurality of receiver devices and the terminal comprises a processing unit which processes the signals received from the photoreceivers coupled to the receiver devices, in order to correlate the data received by the photoreceivers coupled to the receiver devices.

The presence of a plurality of receiver devices as well as a correlation of the data received by the photoreceivers coupled to the receiver devices thus makes it possible to increase the quality of the signal used by the terminal and resulting from the sum of the signals received by each of the receiver devices, reducing the interference between signals received by different receiver devices.

According to an additional characteristic, the processing unit is configured to control the actuators and to orient the slots of the receiver devices so as to maximize separate modulated light signals received.

When separate modulated light signals are transmitted, the actuator of a specific receiver device may be controlled to orient the slot of the specific receiver device so as to maximize a specific associated received signal. Advantageously, this characteristic can allow simultaneously obtaining maximization for different modulated light signals received.

According to one embodiment, a system is proposed for communication via modulated light transmission, comprising a light reception system according to one of the preceding paragraphs, and a plurality of sources in an environment of the light reception system, the plurality of sources transmitting modulated light, the processing unit being coupled to the actuators of the plurality of receiver devices in order to control the actuators with a view to maximizing the received signals for all of the sources.

Such an implementation can thus make it possible to favor joint maximization of the sum of the received signals for all of the sources, rather than favoring maximization for each of the sources independently.

According to an additional characteristic, a system is proposed in which the terminal comprises a first surface and a second surface rotationally mounted one to the other and forming an angle relative to one another, the system comprising a first receiver device applied to the first surface and a second receiver device applied to the second surface, the processing unit being configured to orient the respective slots of the first and second receiver devices so as to respectively receive separate first and second modulated light signals, said first and second signals coming from respective light rays that are not parallel to each other.

Advantageously, such a system can allow effectively propagating information along non-parallel propagation directions while ensuring maximized reception by each receiver device and consequently, in this case, maximized reception by the terminal.

This description also relates to a method for closed-loop control of a receiver device, implemented by a processing unit, comprising: acquiring data received via modulated light by a photoreceiver coupled to a receiver device, detecting, based on the acquired data, a maximum in the data received by the photoreceiver, generating an instruction to control an actuator of the receiver device with a view to maximizing data received by the photoreceiver, based on the detected maximum, transmitting the generated instruction.

This description also relates to a computer program comprising instructions for implementing the steps of the above method when these instructions are executed by a processor of a processing circuit.

BRIEF DESCRIPTION OF DRAWINGS

Other features, details and advantages will become apparent upon reading the detailed description below, and upon analyzing the attached drawings, in which.

DESCRIPTION OF EMBODIMENTS

This description relates to a receiver device for communication via modulated light transmission, labeled 100. Receiver device 100 is intended to be coupled to a terminal which uses data received via modulated light. The terminal may be fixed, such as a television, or mobile, such as a cell phone or laptop. The data received via modulated light may, for example, have been transmitted by a LiFi type of technology. Of course, other terminals and technologies for communication via modulated light transmission are possible.

Figure 1:
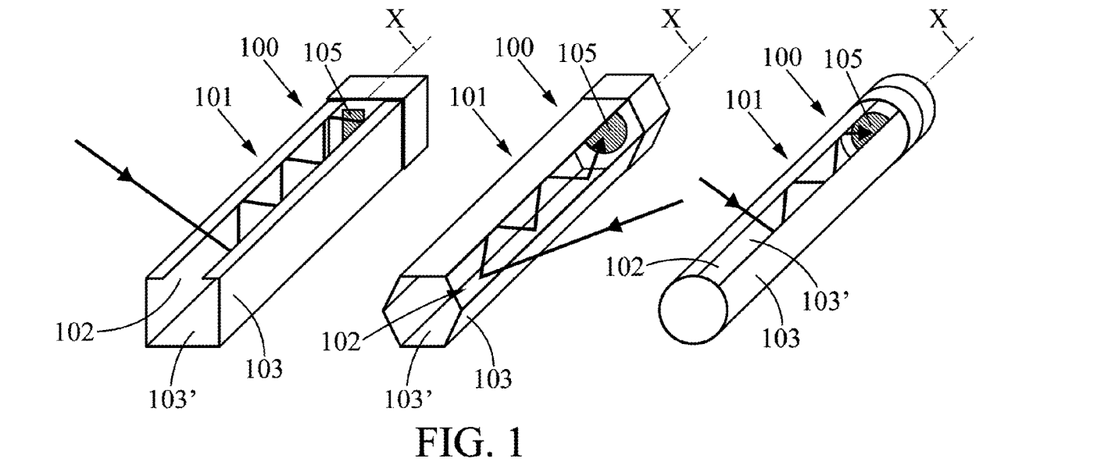
FIG. 1 shows schematic perspective views of receiver devices for communications via modulated light transmission according to various embodiments.

As can be seen in FIG. 1, receiver device 100 mainly comprises a trough 101 comprising a slot 102 and a first guiding surface 103, which are detailed below. Receiver device 100 is further coupled to at least one photoreceiver 105, as detailed below.

As is particularly visible in FIG. 1, first guiding surface 103 can take the form of a hollow and elongated channel. In this embodiment, the shape of first guiding surface 103 determines the shape of trough 101. The trough thus has the shape of a hollow and elongated channel.

First guiding surface 103 comprises at least one internal surface 103' which reflects light and is shaped to guide a light ray by successive reflections to the at least one photoreceiver 105.

First guiding surface 103 can be a surface of a cylinder, where cylinder is understood to mean any oblong shape for which a transverse two-dimensional (2D) cross-section is reproduced identically to itself along a third dimension. The third dimension is represented in the figures by a longitudinal axis X. For example, first guiding surfaces 103 in FIG. 1 are cylinders having rectangular, hexagonal, and circular cross-sections for the left, central, and right diagrams respectively. Of course, any other cross-section could be chosen. Consequently, in this embodiment, the trough has a cylinder shape.

Additionally, when first guiding surface 103 is the surface of a cylinder, trough 101 can be mounted so as to rotate about the longitudinal axis of the cylinder, which allows a degree of freedom in adjusting for example the orientation of trough 101.

Internal surface 103' of first guiding surface 103 is preferably composed of a material whose light reflection coefficient is greater than 0.9.

Internal surface 103' can have a homogeneous surface, such as a mirror for example. It is also possible for internal surface 103' to have a textured surface, i.e. a surface composed of reflective elements arranged to guide the light ray in successive reflections to photoreceiver 105. For example, internal surface 103' can be tiled with a three-dimensional tessellation. The tiling can for example be composed of a plurality of mirrors.

As is particularly visible in FIG. 1, slot 102 is arranged at the entrance to first guiding surface 103. For example, slot 102 can be cut into first guiding surface 103. As illustrated in FIG. 1, when guiding surface 103 has an elongated shape, slot 102 can be cut along a length of guiding surface 103, which can be the longitudinal axis X when guiding surface 103 is the surface of a cylinder. The length of the slot can be less than or equal to the length of the guiding surface.

As already indicated, the receiver device is coupled to a photoreceiver 105. Photoreceiver 105 is arranged to receive the light rays guided via successive reflections by the guiding surface of the trough.

Photoreceiver 105 can be integrated into trough 101. For example, photoreceiver 105 can be housed at one of the ends of trough 101. According to this embodiment, the trough further comprises a communication interface for transmitting data received by photoreceiver 105 to the terminal.

Figure 2:
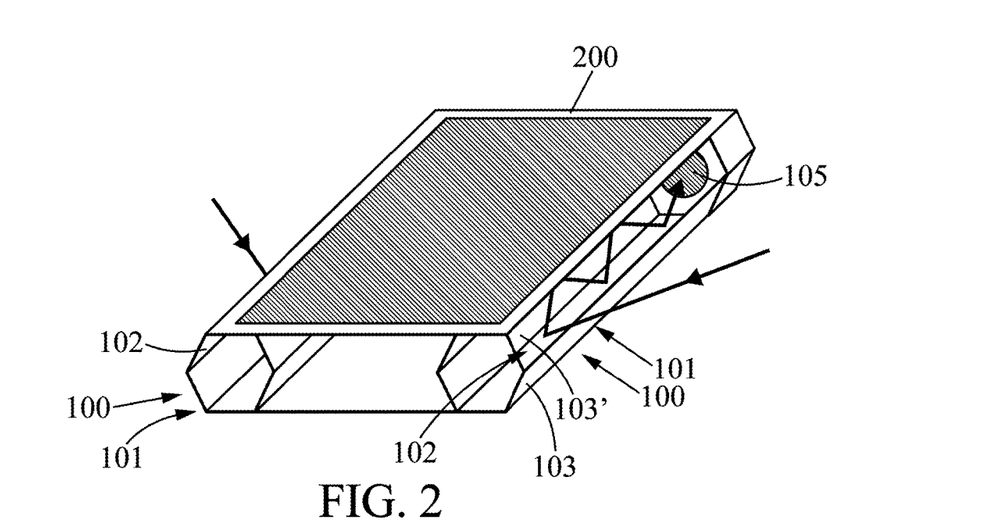
FIG. 2 is a schematic perspective view of a light reception system comprising two receiver devices and a terminal coupled to the receiver devices, according to one embodiment.

Alternatively, the photoreceiver may be part of terminal 200. In this embodiment, receiver device 100 can be mounted on terminal 200 so that photoreceiver 105 is housed at one end of trough 101. For example, as shown in FIG. 2, receiver device 100 can be placed on the side of terminal 200. Additionally or alternatively, receiver device 100 can be placed under a screen of the terminal.

Note that those skilled in the art know how to position receiver device 100 on terminal 200. Indeed, the positioning of receiver device 100, and in particular trough 101, on terminal 200 can vary depending on the shape of the receiver device and of the terminal. In all cases, the receiver device is positioned on the terminal so that the photoreceiver receives the light rays guided via successive reflections by the guiding surface of the trough. In particular, the trough is positioned on the terminal so that the photoreceiver receives the light rays guided via successive reflections by the guiding surface of the trough.

In both cases, as is schematically shown in FIGS. 1 and 2, trough 101 can be oriented to receive at least one light ray of the modulated light, meaning to allow the at least one ray of light to pass through slot 102. Each of the light rays received by slot 102 can then be reflected a first time on internal surface 103', then, via successive reflections on internal surface 103', be guided to photoreceiver 105.

For example, the photoreceiver can be fixed to an internal wall of first guiding surface 103, or housed in a cavity configured for this purpose.

Consequently, receiver device 100 can allow a set of light rays received by trough 101 to be focused on photoreceiver 105. Receiver device 100 can thus enable photoreceiver 105 to receive the light rays arriving directly on photoreceiver 105 as well as all light rays received by trough 101. Comparatively, in the absence of receiver device 100, photoreceiver 105 only receives the light rays arriving directly on photoreceiver 105.

Receiver device 100 can then make it possible to maximize the signal received by photoreceiver 105 by increasing the reception surface area for light rays before converging them towards photoreceiver 105. The received signal can for example be evaluated according to an amplitude, power, or energy received by photoreceiver 105. For example, a signal-to-noise ratio can be used to evaluate the received signal. The evaluation of the signal received by photoreceiver 105 can for example be used to apply a modification to trough 101 with a view to maximizing the received signal as explained in the remainder of the description.

Figure 3:
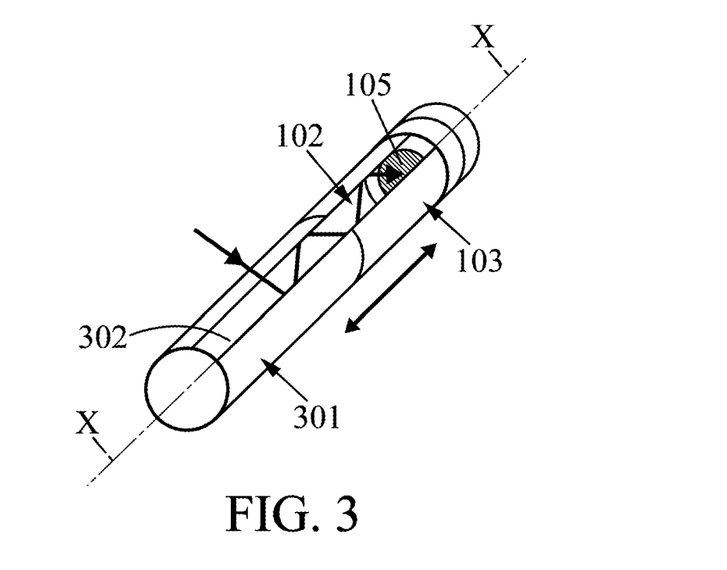
FIG. 3 is a schematic perspective view of a receiver device for communications via modulated light transmission according to one embodiment.

Optionally, the surface area for receiving light rays can be adjustable, as is schematically shown in FIG. 3, which can make it possible to adapt the size of receiver device 100 to a usage requirement. For example, the length of trough 101 can be adjusted to match the length of the terminal to which trough 101 can be mounted. In addition, the length of trough 101 can be controlled so as to maximize the signal received, as detailed below.

Figure 4:
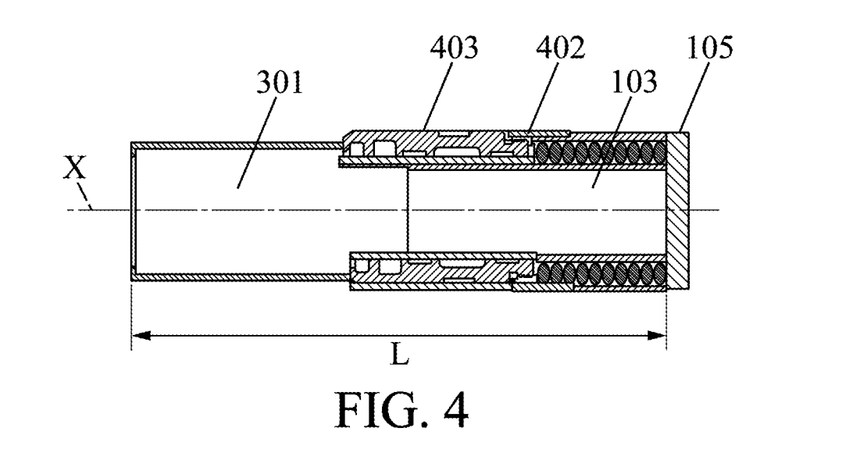
FIG. 4 is a schematic cross-sectional view of a receiver device for communications via modulated light transmission according to an alternative embodiment to FIG. 3.

For this purpose, as can be seen in FIG. 4, trough 101 can accommodate a second guiding surface 301 coupled to a second slot 302, a slide 402, and a slider 403. Second guiding surface 301 and second slot 302 can be identical to first guiding surface 103 and first slot 102 respectively. Slide 402 can be mounted on first guiding surface 103 and can have as its direction the longitudinal axis of first guiding surface 103. Slider 403 can be housed inside slide 402 and can be integral with second guiding surface 301, enabling second guiding surface 301 to slide relative to first guiding surface 103 along the longitudinal axis X. In FIG. 4, the total guide length is denoted H.

Also, the orientation of trough 101 relative to a modulated light source can maximize the reception of all light rays by photoreceiver 105. The expression "orientation of trough 101" can include an inclination of slot 102 and/or an opening of slot 102 and/or a positioning of slot 102 and of first guiding surface 103 relative to a reference, for example a modulated light source. The positioning of slot 102 can for example be tied to the sliding of second guiding surface 301. In the remainder of the description, the expression "orientation relative to a modulated light source" can be abbreviated to "orientation", without specifying that it concerns the orientation relative to a modulated light source.

Figure 5:
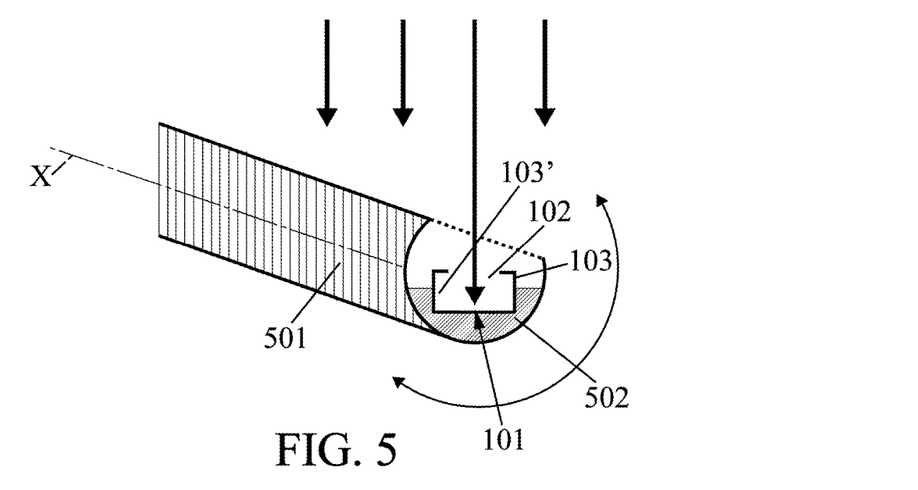
FIG. 5 is a schematic perspective view of a receiver device for communications via modulated light transmission according to another embodiment.

Furthermore, according to a first variant illustrated in FIG. 5, the orientation of trough 101 can be imposed by passive equilibrium. For this purpose, receiver device 100 may further comprise a sealed enclosure 501 containing a liquid 502 and housing trough 101.

Sealed enclosure 501 may be made of a material transparent to modulated light rays, which allows the reception of light rays through trough 101, i.e. through slot 102, and subsequently through first guiding surface 103, both housed in sealed enclosure 501.

Optionally, when first guiding surface 103 is a surface of a cylinder, sealed enclosure 501 can be mounted so as to rotate about the longitudinal axis X of the cylinder.

Trough 101 may be adapted to float on the surface of liquid 502. Thus, as shown in FIG. 5, slot 102 and first guiding surface 103 may be partially immersed in liquid 502. Under the effect of the forces acting on liquid 502, namely the forces of gravity, cohesion of liquid 502, and pressure exerted by the air within sealed enclosure 501, the surface of liquid 502 can tend to be horizontal, which can force slot 102 to be oriented upwards regardless of the orientation of sealed enclosure 501. The expression "upwards" here can mean an ascendant vertical direction.

In particular, when sealed enclosure 501 is mounted so as to rotate about the longitudinal axis X of the cylinder, the orientation of sealed enclosure 501 can vary while the orientation of slot 102 can remain fixed and oriented upwards.

Thus, when the light rays are emitted downwards, i.e. in a descending vertical direction, for example when the light source is a ceiling light, slot 102 of receiver device 100 can advantageously always be oriented upwards, which allows maximizing the reception by receiver device 100.

For example, receiver device 100 can be installed on a safety helmet into which a receptacle for receiver device 100 would be fitted or added. A user wearing the helmet equipped with receiver device 100 could then move over ground that is not necessarily flat, while keeping slot 102 oriented upwards. Similarly, an autonomous robot or a cobot could be equipped with receiver device 100. The receiver device could of course be utilized in other equivalent applications.

As an alternative or addition to the implementation of passive control over the orientation of slot 102, the orientation of trough 101 may be actively controlled, as detailed below.

Figure 6:
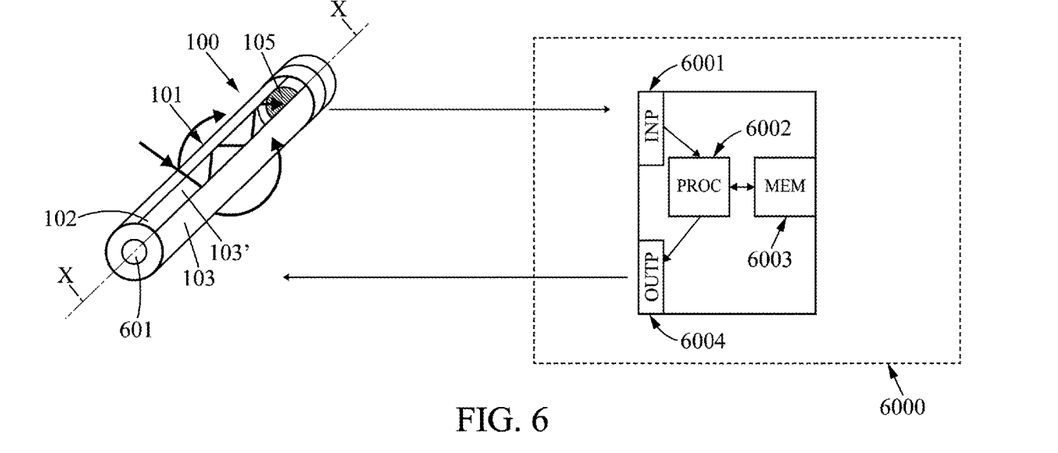
FIG. 6 illustrates a modulated light reception system comprising a receiver device for communications via modulated light transmission and a processing unit which processes the signal received from the photoreceiver coupled to the receiver device.
Figure 7:
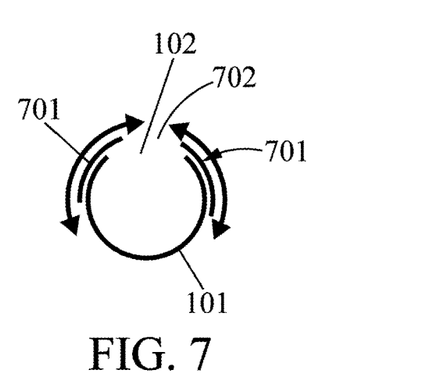
FIG. 7 is a schematic longitudinal section view of a receiver device for communications via modulated light transmission according to an alternative embodiment.

According to variants illustrated in FIGS. 6 to 7, the orientation of trough 101 can be controlled by active closed-loop control aimed at maximizing the received signal. Receiver device 100 can then comprise at least one actuator intended to be controlled by a processing unit 6000 which processes the signal received from photoreceiver 105 in order to orient trough 101 to maximize the received signal. The at least one actuator, for example, may be a mechanical, piezoelectric, or electronic actuator. Of course, other actuators are possible. As previously mentioned, the orientation of trough 101 may include an inclination of slot 102 and/or an opening of slot 102 and/or a positioning of slot 102 and of first guiding surface 103.

More particularly, as illustrated in FIG. 6, in order to control the inclination of slot 102, first guiding surface 103 may include an actuator 601 for rotating the cylinder. Actuator 601 may be a rotary actuator.

As illustrated in FIG. 7, in order to control the opening of slot 102, trough 101 may comprise at least one adjustable opaque flap 701 that can cover slot 102. As can be seen in FIG. 7, two opaque flaps 701 may be arranged one on either side of slot 102, which can create a slot 702 superimposed on slot 102 and having a reduced opening compared to an opening of slot 102. The two opaque flaps 701 can be mounted so as to rotate about the longitudinal axis X of the first guiding surface. The two opaque flaps 701 can be controlled simultaneously by an actuator, which can allow modifying the orientation of slot 702. Modifying the orientation of slot 702 can thus allow maximizing an angle of reception for the signal received by receiver device 100. Additionally or alternatively, each of opaque flaps 701 can be independently controlled by an actuator, which can allow modifying a width of slot 702. Modifying the width of slot 102 can for example allow filtering out stray light rays and maximizing the useful signal received by photoreceiver 105. For example, the value of the signal-to-noise ratio obtained by photoreceiver 105 can be a value to be maximized by the processing unit.

According to another alternative embodiment, the opacity function of the aforementioned opaque flap can be provided by an opaque gas, and thus slot 102 can be obscured by the release of such a gas. In this case, trough 101 can comprise two chambers, one on either side of slot 102, each housing gas, the release of the gas being controlled by an actuator.

As described above, according to one embodiment, trough 101 may house a second guiding surface 301 coupled to a second slot 302 and mounted so as to slide along the longitudinal axis X of first guiding surface 103. In addition, the sliding of second guiding surface 301 may be controlled by an actuator so as to control a total guiding surface area. The actuator can, for example, be a linear actuator integrated into slider 403.

Processing unit 6000, configured to detect a maximum in the received signal, may comprise at least one input interface INP 6001, a processor PROC 6002, a computer memory MEM 6003, and an output interface OUTP 6004, as illustrated in FIG. 6.

Input interface INP 6001 may allow receiving data that are a function of the data received by photoreceiver 105.

Processor PROC 6002 may be configured to execute instructions of a computer program stored in the at least one computer memory MEM 6003.

The computer program may comprise instructions for acquiring data, via input interface INP 6001, that are a function of the data received by photoreceiver 105.

The computer program may also comprise instructions for detecting, from the acquired data, a maximum in the data received by photoreceiver 105. The maximum may for example be a maximum amplitude, a maximum power, or a maximum energy in the acquired data.

In addition, the computer program may generate an instruction for controlling each actuator of receiver device 100 as a function of the maximum in the data received by photoreceiver 105 and with a view to maximizing the data received by photoreceiver 105.

The computer program may also comprise instructions for transmitting the generated instruction, via output interface OUTP 6004.

Examples of instructions for detecting the maximum in the data received by photoreceiver 105 and for generating an instruction for controlling the actuator of receiver device 100 as a function of the maximum in the data received by photoreceiver 105 and with a view to maximizing the data received by photoreceiver 105, are detailed in the remainder of the description.

Data that are a function of the data received by photoreceiver 105 may directly be the data received by photoreceiver 105. Processing unit 6000 may then further comprise at least one transimpedance amplifier which can be configured to convert the data received by photoreceiver 105 into an electrical signal. The at least one processor PROC 6002 may then be further configured to execute instructions which comprise decoding the signal received by the at least one transimpedance amplifier.

Alternatively, the data that are a function of the data received by photoreceiver 105 may be the data received by photoreceiver 105 which have been previously converted and decoded. The conversion and decoding may for example have been carried out by the terminal.

The instruction for controlling an actuator of the device may for example be one among an instruction to rotate trough 101, an instruction to cover slot 102, an instruction to slide second guiding surface 301, or a combination of these instructions, depending on the actuator considered.

The reception maximum may for example be determined using an iterative method.

For example, when the instruction is the instruction to rotate trough 101, starting from any initial orientation, the at least one processor PROC 6002 can implement the instruction to rotate trough 101 according to a fixed increment. A received signal can be evaluated after each rotation of trough 101 and be recorded in a table stored in computer memory MEM 6003. The table may for example comprise the orientation of the trough as well as the reception quality of the associated signal. The instruction to rotate trough 101 can be repeated until a maximum reception quality is obtained for the signal, meaning for example until a first reception quality value is obtained for the signal that is greater than a successive second reception quality value for the signal.

Obviously, the iterative method for determining the reception maximum can be extended to the instructions for covering slot 102 and for sliding second guiding surface 301.

Figure 8:
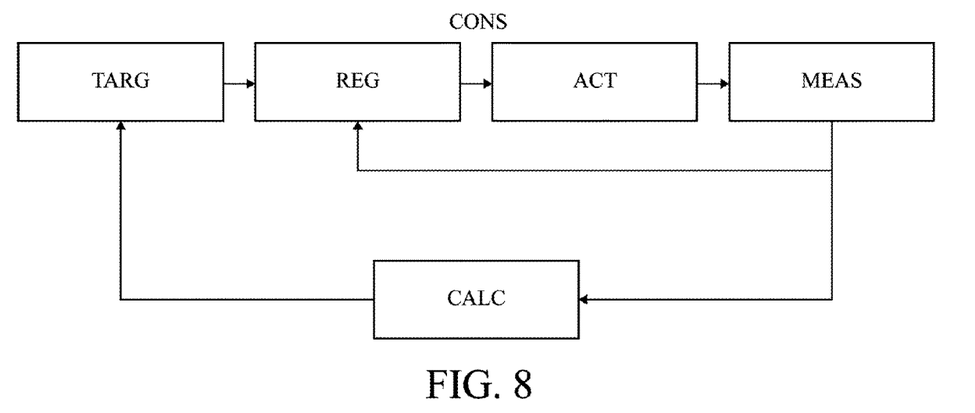
FIG. 8 is a functional diagram of a method for controlling an actuator of a receiver device for communications via modulated light transmission according to a first alternative embodiment.
Figure 9:
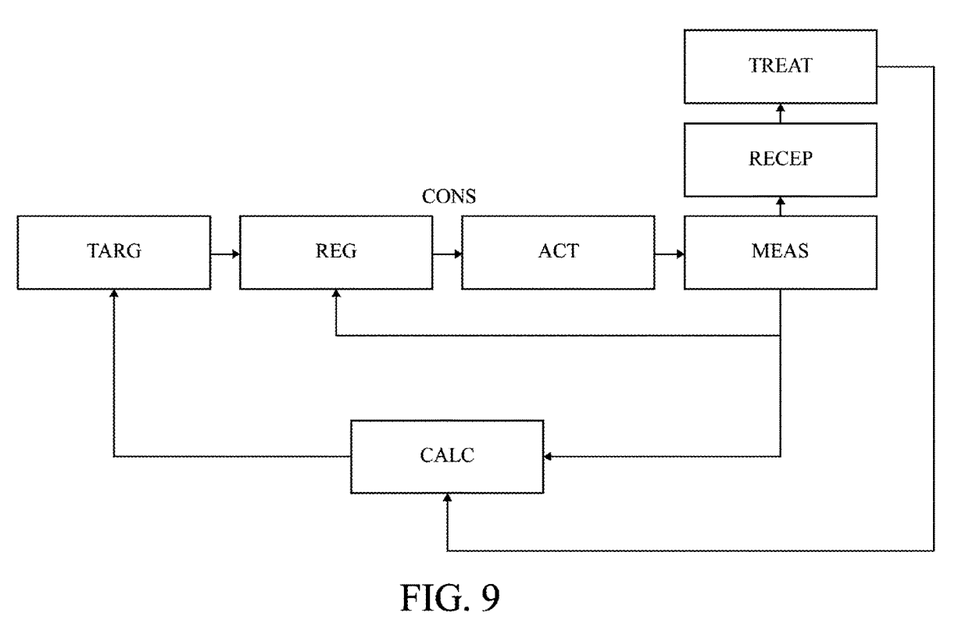
FIG. 9 is a functional diagram of a method for controlling an actuator of a receiver device for communications via modulated light transmission according to a second alternative embodiment.

Additionally or alternatively, as illustrated in FIGS. 8 and 9, the instructions stored in computer memory MEM 4003 may comprise instructions for controlling trough 101 via a feedback loop and issuing the instruction CONS intended for the actuator. Instruction CONS may for example be an instruction to rotate trough 101 as detailed below, but may also be an instruction to cover slot 102 or to slide second guiding surface 301. Note that each type of instruction may have a dedicated feedback loop.

In FIGS. 8 and 9, the feedback loop can include a target value TARG, a regulator REG generating the instruction CONS for rotating trough 101, a step ACT of rotating trough 101 by the actuator, a measured value MEAS, and a calculator CALC.

Target value TARG can for example be a value to be achieved for the signal received from the photoreceiver. Target value TARG can for example be the value maximizing the signal received by the photoreceiver.

Measured value MEAS can for example be a measured value of the signal received by photoreceiver 105.

Regulator REG can take target value TARG and measured value MEAS as input. Regulator REG can calculate a difference between target value TARG and measured value MEAS. Based on the difference between target value TARG and measured value MEAS, regulator REG can generate the instruction CONS intended for the rotation of trough 101 by the actuator during step ACT.

One goal of regulator REG can be to minimize the difference between target value TARG and measured value MEAS. To achieve this, regulator REG can for example be a "PID" type of regulator, where PID is an abbreviation for "Proportional Integral Derivative". Thus, the instruction CONS obtained as output from regulator REG can aim to orient trough 101 so that measured value MEAS approaches target value TARG. The instruction CONS obtained as output from regulator REG can for example be an angular setpoint.

Instruction CONS obtained as output from regulator REG can be applied to the actuator during step ACT, which allows orienting trough 101 so as to obtain a received signal that is close to target value TARG. In response to a change in orientation of trough 101, measured value MEAS can be modified. Measured value MEAS can then be reinjected into regulator REG in order to update instruction CONS obtained as output from regulator REG.

In addition, target value TARG can be updated based on measured value MEAS. For example, calculator CALC can take value MEAS as input and generate a new target value TARG from measured value MEAS.

Calculator CALC can also take context of use data as input in order to generate the new target value TARG. The context of use data can in particular include data concerning a physical environment of use for receiver device 100. For example, if a cloud of smoke is detected near receiver device 100, target value TARG can be reduced and then be increased when the cloud of smoke clears.

In addition, processing unit 4000 can be configured to store in memory MEM 6003 a database comprising the context of use data as well as the associated measured MEAS and target TARG values.

Thus, when a data pair containing the context of use and measured value MEAS is input to calculator CALC, processor PROC 6002 can read memory MEM 6003 in order to find out whether the data pair has already been observed. Where appropriate, the new target value TARG calculated by calculator CALC can directly be target value TARG corresponding to the data pair stored in the database. Use of the database can then allow quickly obtaining an orientation of trough 101 that maximizes the signal received by photoreceiver 105 and can be given preference in environments where the contexts of use are repetitive, such as factories for example.

In addition, the data in the database can form a training database for an artificial intelligence. Thus, target values TARG for data pairs that have not yet been observed can be predicted by the artificial intelligence. The artificial intelligence can, for example, be linear regression or a neural network.

Thus, closed-loop control of the orientation of trough 101 can be implemented in real time, so that the target TARG and measured MEAS values are continually updated.

It is emphasized that processing unit 6000 can be elsewhere than in the terminal, which can enable autonomous closed-loop control of receiver device 100 relative to the terminal. Alternatively, processing unit 6000 can be included in the terminal. In such case, processing unit 6000 can share its resources PROC 6002 and MEM 6003 with the terminal resources.

Additionally, as shown in FIG. 9, calculator CALC can also take as input the values derived from measured value MEAS. The values derived from measured value MEAS may be linked to a use by the terminal of the signal received by photoreceiver 105. In this case, the feedback loop can include a reception step RECEPT where the terminal receives measured value MEAS and a processing step TREAT where the terminal processes the value it received. Processing step TREAT can take into consideration elements linked to an application of the signal received by the terminal. The elements linked to an application of the signal received by the terminal may for example be a signal-to-noise ratio of the signal received by the terminal or a detection of aberrant values in the values of the signal received by the terminal. For example, target value TARG may be modified if the signal received by the terminal has aberrant values. It is emphasized that steps RECEPT and TREAT are implemented by the terminal.

The terminal may also implement an algorithm which allows reducing a possible phase shift and/or time delay between the various light rays received by photoreceiver 105, in order to minimize destructive interference and to encourage constructive interference between the various light rays.

Figure 10:
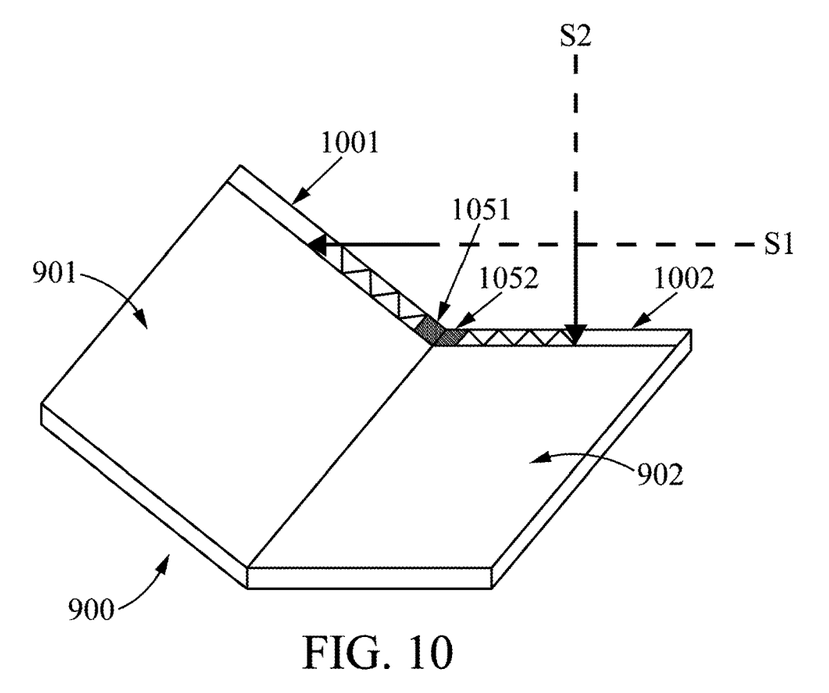
FIG. 10 illustrates a system for communication via modulated light transmission according to one exemplary embodiment.

In addition, as can be seen in FIG. 10, several receiver devices 1001, 1002 may be coupled to a same terminal 900.

Terminal 900 may comprise a processing unit for processing the signals received from photoreceivers 1051, 1052, in order to correlate data received by photoreceivers 1051, 1052, which can make it possible to encourage constructive interference between the various signals received and to increase reception. The processing unit of terminal 900 can be separate from processing unit 6000. Alternatively, the processing unit of terminal 900 can share its resources with processing unit 6000, as has already been mentioned.

When receiver devices 1001, 1002 comprise at least one actuator according to one of the embodiment variants described above, processing unit 6000 can be configured to control each of the receiver devices. For example, processor PROC 6002 can read and execute in parallel the instructions of the computer program stored in memory MEM 6003 for each of the receiver devices, which can make it possible to generate different instructions for each of the actuators.

For example, in an environment composed of several sources, each actuator can be controlled with a view to maximizing the signals received for all the sources. In other words, the actuators can be controlled jointly so as to maximize the reception of signals from all the sources, by all the receiver devices. In particular, this can mean that a source may not be taken into consideration if the reception of signals from that source degrades the reception of signals from other sources by all of the receiver devices.

It may also be chosen to maximize the respective receptions of the modulated light signals for each of the receiver devices. Thus, the exemplary embodiment of FIG. 10 shows a light reception system composed of a terminal 900 and two receiver devices 1001, 1002 and located in an environment comprising a plurality of sources emitting light rays S1 and S2 that are not parallel to each other. Terminal 900 comprises a first surface 901 and a second surface 902 rotationally mounted one to the other and forming an angle relative to one another. For example, terminal 900 can be a laptop computer. Processing unit 6000 may be configured to maximize the reception of light rays S1 by receiver device 1001 and the reception of light rays S2 by receiver device S2.

Figure 11:
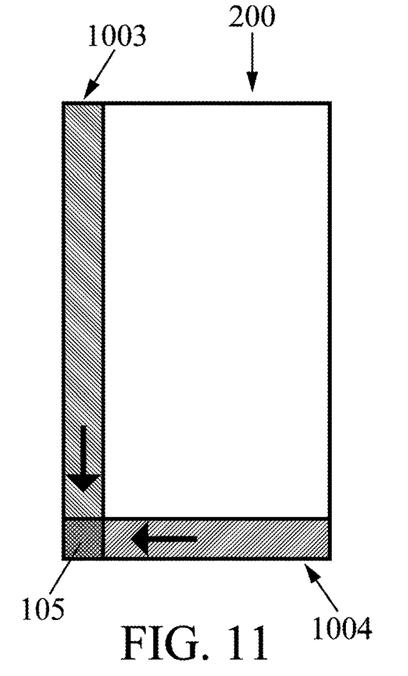
FIG. 11 illustrates an embodiment in which several receiver devices are coupled to a same photoreceiver.

In addition, it is also possible to couple several receiver devices 100 to a same photoreceiver 105. For example, as illustrated in FIG. 11, terminal 200 can be coupled to two receiver devices 1003, 1004 in order to cause the signals received by each of receiver devices 1003, 1004 to converge on a same photoreceiver 105. In this case, receiver devices 1003, 1004 can be chosen among the exemplary embodiments described above. When at least one of receiver devices 1003, 1004 comprises at least one actuator according to one of the embodiment variants described above, processing unit 6000 can be configured to control each of the receiver devices comprising at least one actuator. Processing unit 6000 can be configured to maximize the signal received by photoreceiver 105, i.e. to modify troughs 101 with a view to maximizing the signal received by photoreceiver 105 and resulting from the sum of the signals received by each of receiver devices 1003, 1004. In particular, processing unit 6000 can be configured to maximize the constructive interference between the signals received by each of receiver devices 1003, 1004.

Figure 12:
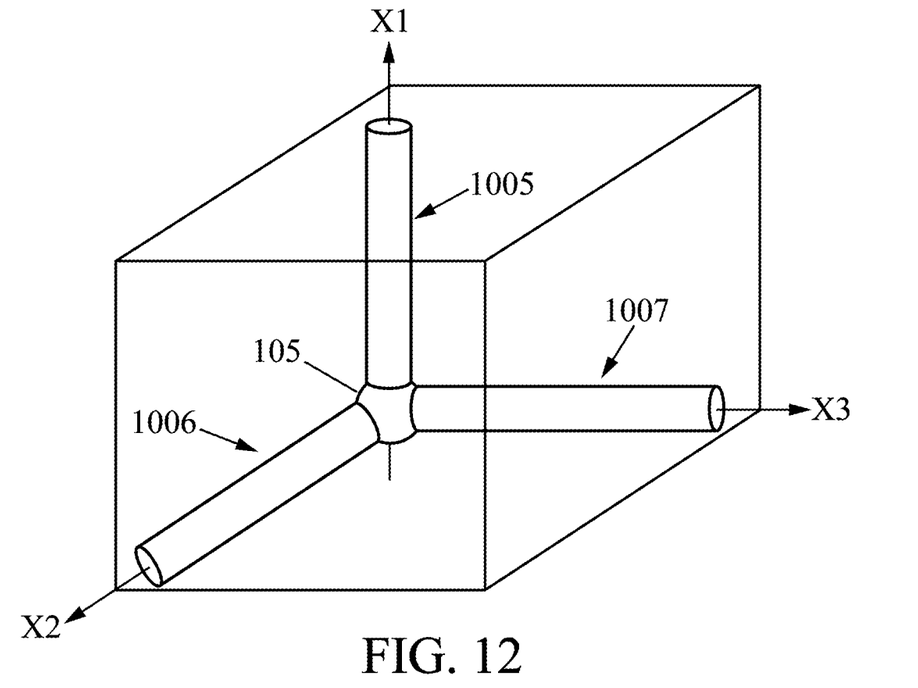
FIG. 12 illustrates an embodiment in which several receiver devices are coupled to a same photoreceiver, in several spatial dimensions.

It is also possible to couple a larger number of receiver devices to a same photoreceiver 105. Thus, as illustrated in FIG. 12, it is possible to couple at least three receiver devices 1005, 1006, 1007 to a same photoreceiver 105. For example, receiver devices 1005, 1006, 1007 can be positioned to form an orthogonal base in a three-dimensional space, with axes denoted X1, X2, X3 in FIG. 12, in which the origin can be photoreceiver 105. This implementation can thus allow a convergence of signals coming from three orthogonal dimensions onto a same photoreceiver 105. As above, when at least one of receiver devices 1005, 1006, 1007 comprises at least one actuator according to one of the variant embodiments described above, processing unit 6000 can be configured to control each of the receiver devices comprising at least one actuator. Processing unit 6000 can thus be configured to maximize the signal received by photoreceiver 105 as explained above.

Of course, it is also possible to couple several receiver devices 100 to a same photoreceiver 105 without imposing any geometric constraint such as the orthogonality described above, between receiver devices 100.

This disclosure is not limited to the examples described above solely by way of example, but encompasses variants.

The embodiments described above are a simple illustration of the development. Various modifications can be made to them without departing from the scope of the embodiments which is made evident from the appended claims.

The invention claimed is:

1. A receiver device for communication via modulated light transmission, configured to be coupled to a terminal which uses data received via modulated light, the receiver device comprising at least one trough, said trough comprising:
    a slot for receiving at least one light ray of the modulated light, and
    a first guiding surface, coupled to the slot,
    said slot being arranged at the entrance to the first guiding surface, the first guiding surface comprising at least one internal surface which is reflective and shaped to guide the light ray by successive reflections to at least one photoreceiver coupled to the receiver device.

2. The receiver device according to claim 1, wherein the trough further comprises the at least one photoreceiver, said photoreceiver being housed at one end of the trough, and a communication interface for transmitting the data received by the at least one photoreceiver to the terminal.

3. The receiver device according to claim 1, further comprising a sealed enclosure containing a liquid, the sealed enclosure being made of a material transparent to said light ray, and wherein the sealed enclosure houses the trough, the trough being able to float on the surface of said liquid, the slot of the trough being oriented upwards by flotation.

4. The receiver device according to claim 1, wherein the first guiding surface is a surface of a cylinder and the trough is mounted so as to rotate about a longitudinal axis of the cylinder.

5. The receiver device according to claim 4, further comprising at least one actuator intended to be controlled by a processing unit which processes the signal received from the photoreceiver, the processing unit being configured to detect a maximum in the received signal, and the actuator being coupled to the processing unit in order to apply a modification to the trough so as to maximize the received signal.

6. The receiver device according to claim 5, wherein the at least one actuator is an actuator for rotating the cylinder in order to orient the slot so as to maximize the received signal.

7. The receiver device according to claim 5, wherein the trough further comprises at least one opaque flap that is adjustable in order to cover the slot and for which the covering action is controlled by the at least one actuator.

8. The receiver device according to claim 4, wherein the trough houses, in addition to the first guiding surface, a second guiding surface coupled to a second slot and mounted so as to slide along a longitudinal axis of the first guiding surface.

9. The receiver device according to claim 5, wherein the trough houses, in addition to the first guiding surface, a second guiding surface coupled to a second slot and mounted so as to slide along a longitudinal axis of the first guiding surface, wherein a sliding of the second guiding surface is driven by the at least one actuator in order to control the total guiding surface area so as to maximize the received signal.

10. A light reception system for receiving modulated light, comprising at least one receiver device according to claim 1, and a terminal coupled to the receiver device in order to use the data received via modulated light.

11. A light reception system according to claim 10, comprising a receiver device and a processing unit which processes the signal received from the photoreceiver and is configured to detect a maximum in the received signal, the processing unit being coupled to the actuator in order to apply a modification to the trough so as to maximize the received signal, the receiver device comprising at least one actuator to be controlled by the processing unit which processes the signal received from the photoreceiver, the processing unit being configured to detect a maximum in the received signal, and the actuator being coupled to the processing unit in order to apply a modification to the trough so as to maximize the received signal.

12. A light reception system according to claim 11, wherein the processing unit is configured to send adjustment instructions to said actuator and to store said instructions in memory with links to context of use data for the light reception system, the storage in memory forming a training database for an artificial intelligence capable of being implemented by the processing unit in order to issue target instructions to the actuator according to a current context of use.

13. A system for communication via modulated light transmission, comprising a light reception system according to claim 10, and a plurality of sources in an environment of the light reception system, the plurality of sources transmitting modulated light, the processing unit being coupled to the actuators of the plurality of receiver devices in order to control the actuators with a view to maximizing the received signals for all of the sources.

14. A method implemented by a processing unit, the method comprising:
    acquiring data received via modulated light by a photoreceiver coupled to a receiver device according to claim 5,
    detecting, based on the acquired data, a maximum in the data received by the photoreceiver,
    generating an instruction to control an actuator of the receiver device with a view to maximizing data received by the photoreceiver, based on the detected maximum,
    transmitting the generated instruction.

15. A non transitory computer storage medium storing instructions of a program for implementing the method for controlling the actuator according to claim 14, when this program is executed by a processor.

* * * * *